United States Patent
Chen et al.

(10) Patent No.: US 7,188,315 B2
(45) Date of Patent: Mar. 6, 2007

(54) METHOD OF ESTABLISHING A CUSTOMIZED WEBPAGE DESKTOP

(75) Inventors: Hung-Ming Chen, Taipei (TW); Lu-Yun Tai, Taoyuan (TW); Ping-Hui Hsiao, Taipei (TW)

(73) Assignee: Tatung Co., Ltd., Taipei (TW)

( * ) Notice: Subject to any disclaimer, the term of this patent is extended or adjusted under 35 U.S.C. 154(b) by 741 days.

(21) Appl. No.: 10/377,882

(22) Filed: Mar. 4, 2003

(65) Prior Publication Data

US 2004/0104929 A1 Jun. 3, 2004

(30) Foreign Application Priority Data

Dec. 2, 2002 (TW) ............................... 91134922 A

(51) Int. Cl.
*G06F 17/00* (2006.01)
(52) U.S. Cl. ...................... 715/764; 715/781; 715/804; 715/765
(58) Field of Classification Search ................ 715/789, 715/788, 764, 804, 781–783, 805, 765, 866, 715/513, 760, 782, 700
See application file for complete search history.

(56) References Cited

U.S. PATENT DOCUMENTS

| 5,644,737 | A | * | 7/1997 | Tuniman et al. | 715/810 |
| 5,905,492 | A | * | 5/1999 | Straub et al. | 715/744 |
| 6,008,806 | A | * | 12/1999 | Nakajima et al. | 715/744 |
| 6,023,272 | A | * | 2/2000 | Malamud et al. | 715/779 |
| 6,061,695 | A | * | 5/2000 | Slivka et al. | 715/513 |
| 6,072,486 | A | * | 6/2000 | Sheldon et al. | 715/835 |
| 6,278,448 | B1 | * | 8/2001 | Brown et al. | 715/866 |
| 6,448,986 | B1 | * | 9/2002 | Smith | 715/801 |
| 6,512,526 | B1 | * | 1/2003 | McGlothlin et al. | 715/762 |
| 6,513,158 | B1 | * | 1/2003 | Yogaratnam | 717/166 |
| 6,624,831 | B1 | * | 9/2003 | Shahine et al. | 715/815 |
| 6,630,943 | B1 | * | 10/2003 | Nason et al. | 715/746 |
| 6,950,991 | B2 | * | 9/2005 | Bloomfield et al. | 715/738 |
| 6,957,390 | B2 | * | 10/2005 | Tamir et al. | 715/744 |
| 2001/0051998 | A1 | * | 12/2001 | Henderson | 709/217 |
| 2002/0002488 | A1 | * | 1/2002 | Muyres et al. | 705/14 |
| 2002/0188758 | A1 | * | 12/2002 | Nakajima et al. | 709/245 |
| 2002/0196279 | A1 | * | 12/2002 | Bloomfield et al. | 345/749 |
| 2003/0160816 | A1 | * | 8/2003 | Zoller et al. | 345/735 |
| 2003/0191729 | A1 | * | 10/2003 | Siak et al. | 706/45 |
| 2003/0233425 | A1 | * | 12/2003 | Lyons et al. | 709/217 |
| 2004/0135819 | A1 | * | 7/2004 | Maa | 345/840 |
| 2004/0165007 | A1 | * | 8/2004 | Shafron | 345/781 |
| 2005/0188318 | A1 | * | 8/2005 | Tamir et al. | 715/744 |

\* cited by examiner

*Primary Examiner*—Tadesse Hailu
(74) *Attorney, Agent, or Firm*—Bacon & Thomas, PLLC

(57) ABSTRACT

The present invention relates to a method of establishing a customized webpage desktop applied in an information apparatus. After an operating system is enabled, a shell program is initialized, and a browser is called to register the browser as a desktop format, and to cause the browser to display information on the corresponding desktop area of the information apparatus. A webpage file is read from a specific directory according to a path pointed to by the shell program. The webpage file has local application links. The browser reads the webpage file and displays the webpage file in the desktop format in the desktop area of the information apparatus to form the customized webpage desktop.

20 Claims, 4 Drawing Sheets

METHOD OF ESTABLISHING A CUSTOMIZED WEBPAGE DESKTOP

BACKGROUND OF THE INVENTION

1. Field of the Invention

The present invention relates to a method of establishing a desktop and, more particularly, to a method of establishing a customized webpage desktop that is applied to a desktop shell program.

2. Description of the Related Art

Currently, desktop is displayed by a general information apparatus, such as in the Windows operating system developed by Microsoft. A standard shell program enables a user to drag a program link and/or a shortcut to a desktop to change the desktop arrangement and to select various pictures or colors as the desktop background.

However, the prior art standard shell program can only provide changes to the functionality of the desktop, but cannot satisfy different customized requirements for different information devices. Furthermore, the standard shell program is not suited for a vertical market having specific applications, or for application software in specialized markets, such as the desktops of medical information devices in hospitals or the desktops of administration information devices in government. Although the prior art standard shell program also provides some software tools for desktop customization, after the desktop is edited, the user still needs to re-compile the entire shell program, which is very inconvenient for the user.

In addition, the prior art standard shell program also provides a method of establishing a customized webpage desktop, but the prior art design tool for the customized webpage desktop has to fit into the standard shell program, and the prior art taskbar program is incompatible with the standard shell program.

Therefore, it is desirable to provide an improved method of establishing a customized webpage desktop to mitigate and/or obviate the aforementioned problems.

SUMMARY OF THE INVENTION

The objective of the present invention is to provide a method of establishing a customized webpage desktop which can call a local application and change the desktop by changing the webpage, to achieve the customized webpage desktop functionality.

Another objective of the present invention is to provide a customized webpage desktop which can reduce system development costs and which does not require modification and shell program re-compilation. Furthermore, the taskbar program is made compatible with the shell program, which increases convenience and compatibility.

In order to achieve the above-mentioned objectives, the method of establishing a customized webpage desktop of the present invention is applied in an information apparatus. An operating system is installed in the information apparatus. The operating system includes a shell program for displaying a webpage desktop in a desktop area. The method comprises: enabling the operating system; initializing the shell program and calling a browser to register the browser as a desktop format, and causing the browser to display information on the corresponding desktop area of the information apparatus; reading a webpage file from a specific directory according to a path pointed to by the shell program, the webpage file comprising a plurality of local application links; and the browser reading the webpage file and displaying the webpage file in the desktop format in the desktop area of the information apparatus to form the customized webpage desktop.

An execution process of the present invention can be completed by a software program, and the present invention can be written in an appropriate computer language to be loaded onto a computer readable medium. The medium can be an IC chip, a hard disk, an optical disk or any other software recording medium, but random access memory is considered a better choice as it is easy to update.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
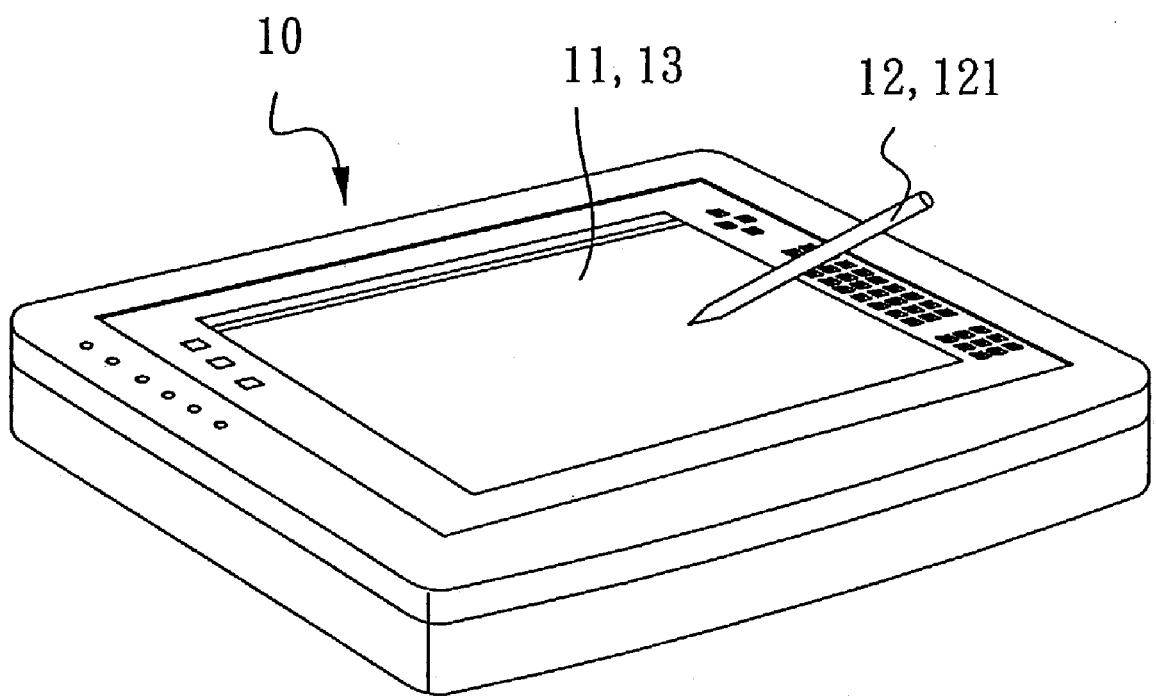
FIG. 1 illustrates an environment schematic drawing of the present invention.

Please refer to FIG. 1. FIG. 1 is a schematic drawing of a practicing environment according to the present invention. In a first embodiment, a tablet PC 10 comprises a pen-based panel 11, operating with an input device 12, and is used for performing signal inputting functionality thereon. The input device 12 is a touch pen 121 (also called a handwriting pen), but a user can also use a finger or a pen-point as an input end. Furthermore, the embodiment can also be applied to an equivalent pen-based apparatus, such as a personal digital assistant (PDA), a pocket PC, etc. The tablet PC 10 utilizes the Windows CE.NET operating system; a shell program is provided by the explorer.exe application program, which is used for interpretation and execution of commands obtained from the user and sent to the operating system. A browser is registered as a webpage format to form a webpage desktop area 2 to display a webpage desktop on a desktop 13.

Figure 2:
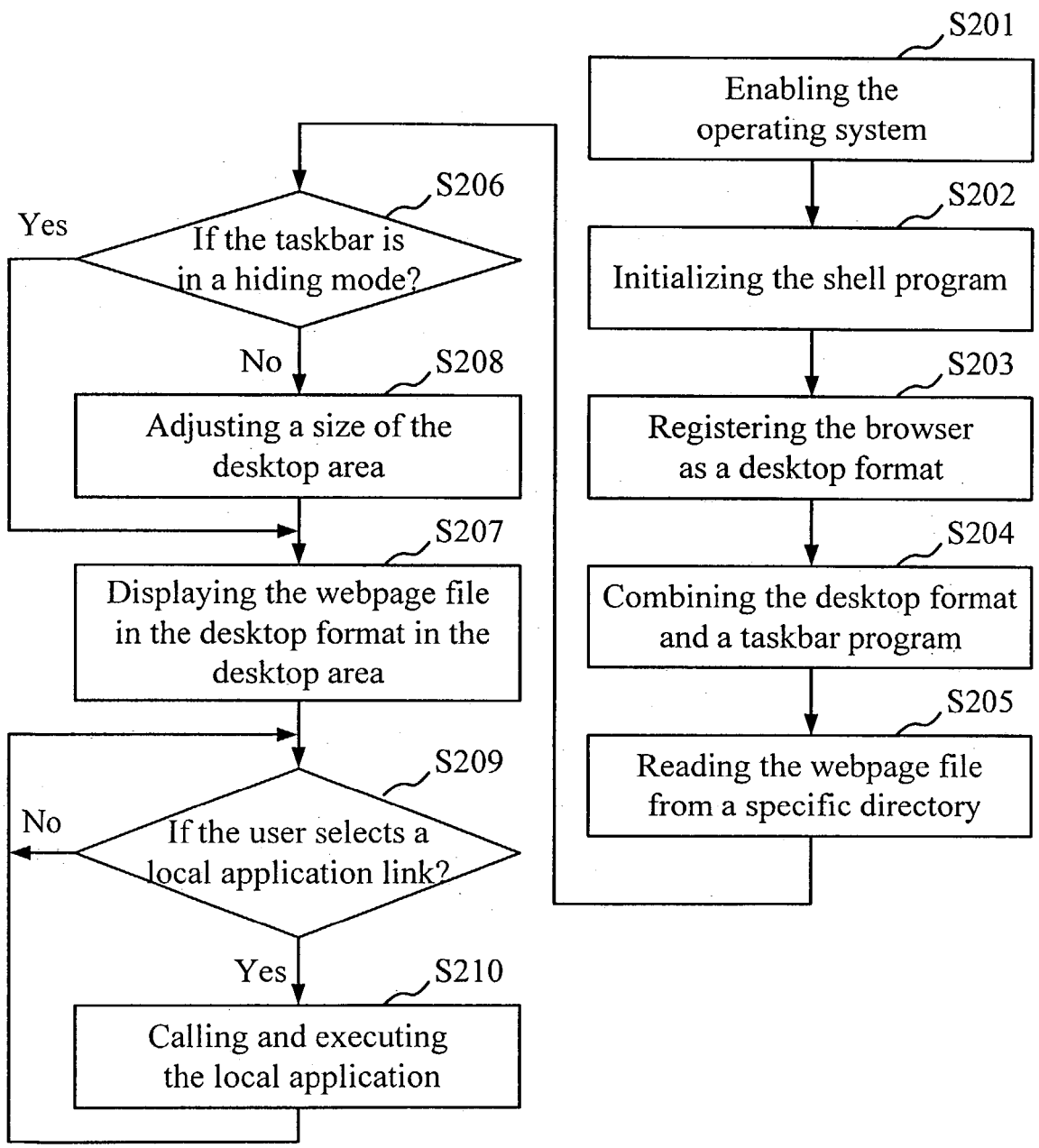
FIG. 2 is a flowchart of establishing a customized webpage desktop according to a first embodiment of the present invention.
Figure 3:
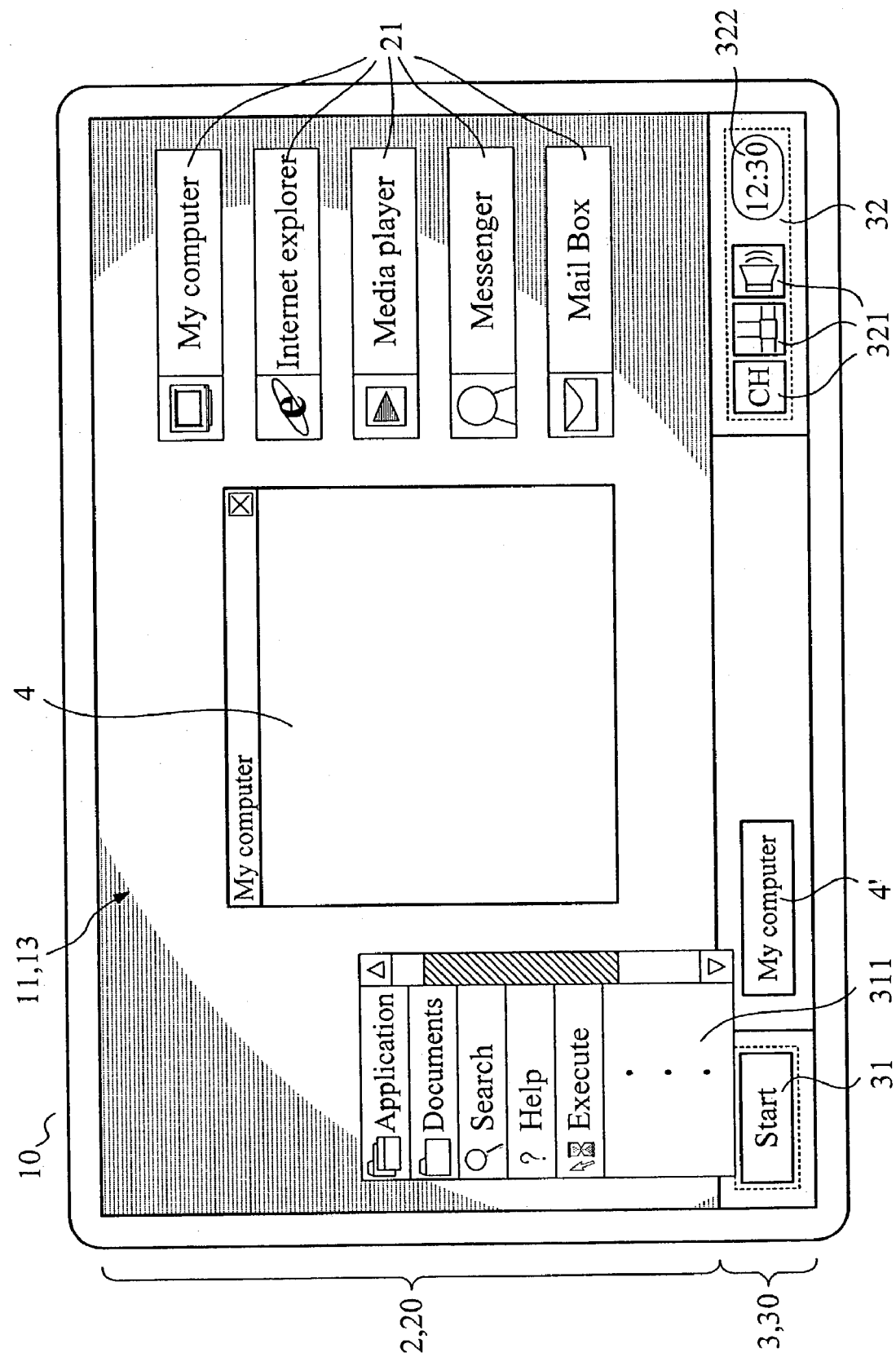
FIG. 3 is a schematic drawing of a customized webpage desktop according to the first embodiment of the present invention.

Please refer to FIG. 2 and FIG. 3. FIG. 2 is a flowchart of establishing a customized webpage desktop according to a first embodiment of the present invention. FIG. 3 is a schematic drawing of a customized webpage desktop according to the first embodiment of the present invention. A shell program of the information apparatus 10 displays the desktop 13 which comprises a webpage desktop area 2 for displaying a webpage desktop 20 and a taskbar area 3 for displaying a taskbar (also called toolbar) 30. The desktop 13 of the information apparatus 10 can display the webpage desktop area 2 and the taskbar area 3 optionally, or even display other areas for specific functionality.

In order to display the webpage desktop 20 and the taskbar 30 on the desktop 13, after the Windows CE.NET operating system of the information apparatus 10 is enabled (step 201), the shell program is initialized (step 202), and related controls in the browser are called by the setting of the shell program and the browser as a registered desktop format (step 203), enabling the browser to display the webpage on the webpage desktop area 2 accordingly. Then, the desktop format and the taskbar program are combined together and registered as a shell program (step 204). The taskbar program is used to display the taskbar 30 shown in FIG. 3 on the taskbar area 3 of the information apparatus 10.

The webpage desktop 20 is a webpage file stored in a specific directory, preferably a file in the HTML (Hypertext Markup Language) format, and JavaScript, VBScript, JScript, CSS, or any other equivalent webpage program language format. The information apparatus 10 can read the webpage file from the specific directory according to a path pointed to by the shell program (step 205).

The above-mentioned content of the webpage file is designed according to user requirements or desires to realize customization functionality. There are a plurality of local applications defined in the webpage file, so the user can select one local application on the webpage desktop 20 for execution. Furthermore, the specific directory can be a pre-defined directory, which is easy for the shell program to read directly, or a specific directory set by the user, such as a folder directory, a webpage directory, a network address, etc. Therefore, in step 205, if the information apparatus 10 receives a webpage updating command pointing to a webpage directory, the information apparatus 10 will read the webpage from the webpage directory.

Figure 4:
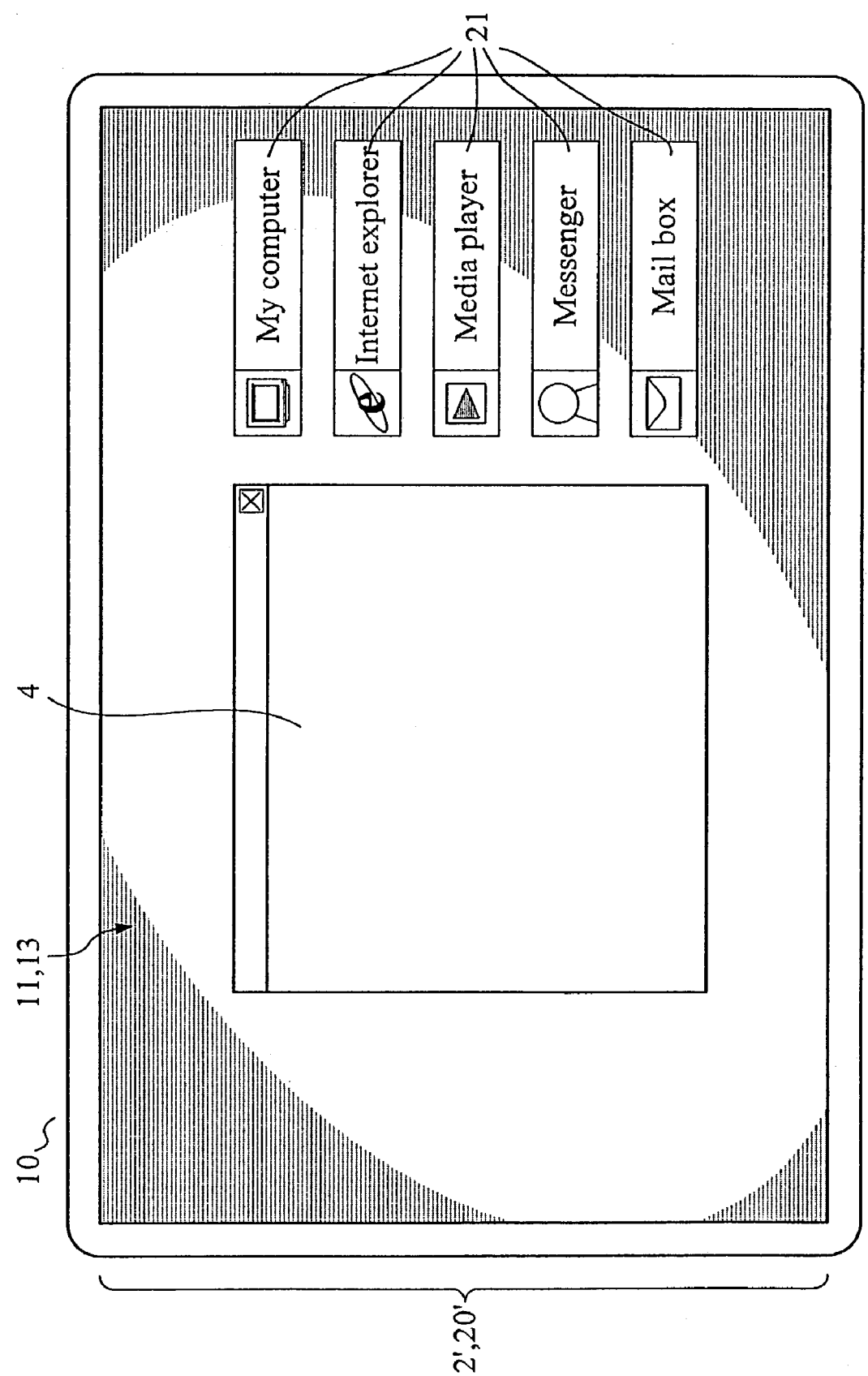
FIG. 4 is a schematic drawing of a customized webpage desktop according to a second embodiment of the present invention.

The taskbar 30 of the desktop 13 can be flexibly adjusted to operate in a displaying mode or an automatic hiding mode. If the taskbar 30 is in the displaying mode, the taskbar 30 will be displayed in the region defined by the taskbar area 3; if the taskbar 30 is in the automatic hiding mode, the taskbar 30 will not be displayed in the region defined by the taskbar area 3 until the user clicks on or moves a cursor to the hidden taskbar 30. In the first embodiment, the taskbar 30 is set in the displaying mode (step 206), so the desktop 13 displays the taskbar 30, and the browser reads the webpage file and displays it on the webpage desktop area 2 to form the webpage desktop 20 (step 207). In a second embodiment shown in FIG. 4, the taskbar 30 is set in the automatic hiding mode (step 206); the information apparatus 10 combines the webpage desktop area 2 and the taskbar area 3 together to generate a larger webpage desktop area 2', and adjusts the size of the browser (step 208) to display the webpage file on the webpage desktop area 2' to form the webpage desktop 20'.

The taskbar 30 includes a start button 31 and a system tray area 32. The user can click on the start button 31 to start a start menu 311 to select software to be executed, or to select a file to be opened. The system tray area 32 includes a plurality of icons 321 and a time display area 322. The plurality of icons 321 are used to execute a plurality of corresponding system tray functions, such as for indicating an inputting manner state, for monitoring a network link state, volume adjustment, and etc. When a window 4 for an acting program is displayed in the webpage desktop 20, the taskbar 30 will display a corresponding minimized window 4'. In addition, arrangement of any icons, areas, or menu can be adjusted as required.

When the information apparatus 10 receives a local application link 21 selected by the user (step 209), the information apparatus 10 uses an Active X Control component to call and execute a corresponding local application (step 210).

In the present invention, the method of establishing a customized webpage desktop can provide a webpage desktop by combining functionality from the browser, so when the webpage is changed, the desktop will be changed too, without requiring desktop program modification and re-compilation. Therefore, the present invention can offer high application flexibility, satisfy different user's customized requirement needs, and reduce system development costs.

The above-mentioned steps can be written as a software program in any suitable computer language, and be compiled or assembled for execution. The software program can be stored on any recording media that can be recognized and decoded by a processing unit, or any product comprising such a recording media. The recording media can be a hard disk, a floppy disk, an optical disk, a ZIP disk, an MO, an IC chip, RAM, or any other known product. As all of the detailed steps are completely described, there is no need for further explanation.

The invention has been described using exemplary preferred embodiments. However, for those skilled in this field the preferred embodiments can be easily adapted and modified to suit additional applications without departing from the spirit and scope of this invention. Thus, it is to be understood that the scope of the invention is not limited to the disclosed embodiments. On the contrary, it is intended to cover various modifications and similar arrangements based upon the same operating principle. The scope of the claims, therefore, should be accorded the broadest interpretations so as to encompass all such modifications and similar arrangements.

Although the present invention has been explained in relation to its preferred embodiment, it is to be understood that many other possible modifications and variations can be made without departing from the spirit and scope of the invention as hereinafter claimed.

What is claimed is:

1. A method of establishing a customized webpage desktop applied in an information apparatus, an operating system being installed in the information apparatus, the operating system including a shell program for displaying a webpage desktop in a desktop area, the method comprising:
   (A) enabling the operating system;
   (B) initializing the shell program and calling a browser to register the browser as a desktop format, and causing the browser to display information on the corresponding desktop area of the information apparatus;
   (C) reading a webpage file from a specific directory according to a path pointed to by the shell program, the webpage file comprising a plurality of local application links; and
   (D) the browser reading the webpage file and displaying the webpage file in the desktop format in the desktop area of the information apparatus to form the customized webpage desktop.

2. The method as claimed in claim 1, wherein in step (C) the specific directory is a pre-defined directory.

3. The method as claimed in claim 1, wherein in step (C) when the shell program receives a webpage updating command, the shell program reads the webpage file from a specific directory according to a path pointed to by the webpage updating command.

4. The method as claimed in claim 3, wherein the path pointed to by the shell program points to a webpage directory, the webpage directory including a webpage file.

5. The method as claimed in claim 3, wherein the path pointed to by the shell program points to a network address.

6. The method as claimed in claim 1, wherein the shell program further displays a taskbar in a taskbar area of the desktop, the taskbar including a system tray area and a plurality of icons; a mode of the taskbar area being set up selected from the group of a displaying mode and an automatic hiding mode, the displaying mode indicating that the taskbar area and the desktop area are displayed simultaneously on the desktop, the automatic hiding mode indicating that the taskbar area and the desktop area are merged together.

7. The method as claimed in claim 6, wherein step (C) further comprises: combining the desktop format and a taskbar program, wherein the taskbar program is used to display the taskbar on the corresponding taskbar area of the information apparatus.

8. The method as claimed in claim 7, wherein step (D) further comprises: determining if the taskbar program is in the automatic hiding mode; if it is, combining the taskbar area and the desktop area together, and adjusting a size of the browser to display the webpage file on the desktop area.

9. The method as claimed in claim 1, wherein a step (E) is further provided after step (D): receiving a selection command for one local application link from a user.

10. The method as claimed in claim 9, wherein a step (F) is further provided after step (E): calling and executing a local application pointed to by the selected local application link.

11. The method as claimed in claim 10, wherein the information apparatus utilizes an Active X control component to call and execute the local application.

12. The method as claimed in claim 1, wherein the webpage file is in an HTML (Hypertext Markup Language) format.

13. A computer readable recording medium storing a software program adapted for execution in an information apparatus, an operating system being installed in the information apparatus, the operating system including a shell program for displaying a webpage desktop in a desktop area, the software program comprising:
a first program code for enabling the operating system;
a second program code for initializing the shell program and calling a browser to register the browser as a desktop format, and causing the browser to display information on the corresponding desktop area of the information apparatus;
a third program code for reading a webpage file from a specific directory according to a path pointed to by the shell program, the webpage file comprising a plurality of local application links; and
a fourth program code to enable the browser to read the webpage file and display the webpage file in the desktop format in the desktop area of the information apparatus to form the customized webpage desktop.

14. The recording medium as claimed in claim 13, wherein in the third program code when the shell program receives a webpage updating command, the shell program reads a webpage file from a specific directory according to a path pointed to by the webpage updating command.

15. The recording medium as claimed in claim 13, wherein the shell program further displays a taskbar in a taskbar area of the desktop, the taskbar including a system tray area and a plurality of icons; a mode of the taskbar area being set up selected from the group of a displaying mode and an automatic hiding mode, the displaying mode indicating that the taskbar area and the desktop area are displayed simultaneously on the desktop, the automatic hiding mode indicating that the taskbar area and the desktop area are merged together.

16. The recording medium as claimed in claim 15, wherein the second program code is further capable of combining the desktop format and a taskbar program, wherein the taskbar program is used to display the taskbar on the corresponding taskbar area of the information apparatus.

17. The recording medium as claimed in claim 16, wherein the third program code is further capable of determining if the taskbar program is in the automatic hiding mode; if it is, combining the taskbar area and the desktop area together, and adjusting size of the browser to display the webpage file on the desktop area.

18. The recording medium as claimed in claim 13, wherein the software program further comprises a fifth program code for receiving a selection command for one local application link from a user.

19. The recording medium as claimed in claim 14, wherein the software program further comprises a sixth program code for calling and executing a local application pointed to by the selected local application link.

20. The recording medium as claimed in claim 19, wherein the information apparatus utilizes an Active X control component to call and execute the local application.

* * * * *